United States Patent [19]

Cresson

[11] Patent Number: 4,944,218

[45] Date of Patent: Jul. 31, 1990

[54] VENDING MACHINE FOR PREPARING AND DELIVERING HAMBURGERS

[76] Inventor: Christian Cresson, 6, rue Marie-Thérèse de Poix, Sepmes F-37800 Sainte Maure de Touraine, France

[21] Appl. No.: 334,282

[22] Filed: Apr. 6, 1989

[30] Foreign Application Priority Data

Apr. 12, 1988 [FR] France ............................ 88 04820

[51] Int. Cl.[5] ..................... A21D 13/08; A23L 1/31; B65B 25/16; G07F 11/70

[52] U.S. Cl. ..................................... 99/357; 99/334; 99/356; 99/443 C; 99/450.4

[58] Field of Search ................ 99/357, 358, 451, 334, 99/443 R, 443 C, 356, 355, 450.4, 450.1; 118/13, 20, 24, 25; 426/524, 274; 221/124, 150 A, 150 HC, 251

[56] References Cited

U.S. PATENT DOCUMENTS

| | | | |
|---|---|---|---|
| 1,973,195 | 9/1934 | Ankcorn . | |
| 2,501,712 | 3/1950 | Chodziesner . | |
| 2,810,359 | 10/1957 | Standford | 99/450.4 |
| 3,117,511 | 1/1964 | Everett . | |
| 3,183,856 | 5/1965 | Jolly | 99/450.4 |
| 3,338,155 | 8/1967 | Lindblad et al. | 99/356 |
| 3,364,878 | 1/1968 | Kobori et al. | 99/450.4 |
| 3,384,497 | 5/1968 | Gassmann . | |
| 3,855,912 | 12/1974 | Schoonmaker | 99/450.4 |
| 3,859,904 | 1/1975 | Carriazo | 99/450.7 |
| 4,202,260 | 5/1980 | Weger | 99/450.4 |

FOREIGN PATENT DOCUMENTS 2589686 12/1987 France .

*Primary Examiner*—Timothy F. Simone
*Attorney, Agent, or Firm*—Young & Thompson

[57] ABSTRACT

Automatic operation of a vending machine for preparing and delivering hamburgers can be initiated by a consumer by means of a payment system. The vending machine comprises, in the direction of feed of a conveyor which terminates at a station for the delivery of each hamburger:

an oven for cooking each reconstituted portion of steak supplied from a reserve or from a reconstituting apparatus, a first station for delivering half-rolls of bread on the conveyor in order that each half-roll may serve as an element for receiving a reconstituted steak portion supplied from the cooking oven, one or a number of successive magazines for delivering various additive ingredients, each magazine being capable of depositing a dose of the corresponding ingredient on a reconstituted steak portion carried by a half-roll, a second station for delivering half-rolls of bread in order that each half-roll may serve as a covering element on a reconstituted steak portion already carried by another half-roll.

11 Claims, 4 Drawing Sheets

VENDING MACHINE FOR PREPARING AND DELIVERING HAMBURGERS

BACKGROUND OF THE INVENTION

The preparation of food products known as hamburgers is carried out by hand by taking a piece of meat from a cooking oven and placing it between two halves of a bread roll. As a general rule, this piece of meat consists of minced steak. However, the piece of meat could also be of a different kind such as a piece of chicken, for example. It is for this reason that, throughout the description which now follows, the term "hamburger" will designate in a general sense any food product consisting of a piece of meat of any kind which has just been cooked and is placed between two half-rolls of bread.

There are usually introduced in a food product of this type additional ingredients such as, for example, spices, onions or a seasoning sauce such as a tomato-base piquant sauce, more commonly known as tomato ketchup.

The preparation of hamburgers therefore calls for a certain number of manual operations which delay their production and increase their cost price. Moreover, this limits the possibilities of establishment of consumption locations as well as the periods during which consumers may be served.

For the reasons given above, the present invention has for its object a vending machine specially designed to enable a consumer himself (or herself) to order the automatic preparation of a hot hamburger which is ready to be consumed and in which the steak portion is cooked just before consumption. This vending machine is intended to operate at any moment without any need for personnel and to be at the disposal of consumers who are thus able to obtain hot hamburgers which are made according to requirements and not simply reheated.

SUMMARY OF THE INVENTION

The vending machine is distinguished by the fact that its operation can be initiated by a consumer by means of a payment system and that said machine comprises in the direction of feed of one or a plurality of conveyors terminating in an orifice for the reception of each hamburger:

- a cooking oven through which the conveyor passes and which is capable of cooking each piece of meat supplied from a reserve of deep-frozen pieces of meat or from an apparatus for the preparation of these latter,
- a first station for delivering a first series of half-rolls of bread on the conveyor in order that each half-roll may serve as an element for receiving a piece of meat supplied from the cooking oven,
- a second station for delivering a second series of half-rolls of bread in order that each half-roll may serve as a covering element on a piece of meat already carried by a first half-roll of the first series,
- a station for wrapping each hamburger thus formed, the function of this station being to wrap said hamburger between two films of plasticized paper or the like, within a kind of pouch which is open on one side.

In an advantageous embodiment, the present machine comprises, between the two magazines for delivering half-rolls, a series of several successive magazines for delivering additive ingredients and a programmer is provided for controlling these different magazines so as to enable the consumer to choose the ingredient or ingredients to be added to the reconstituted steak of the hamburger which he (or she) has ordered.

Thus a consumer may choose these ingredients and seasoning products beforehand while at the same time ordering the preparation and delivery of one or a number of hamburgers by operating the payment system of the vending machine and controlling the programmer of the machine.

DESCRIPTION OF THE PREFERRED EMBODIMENTS

Figure 1:
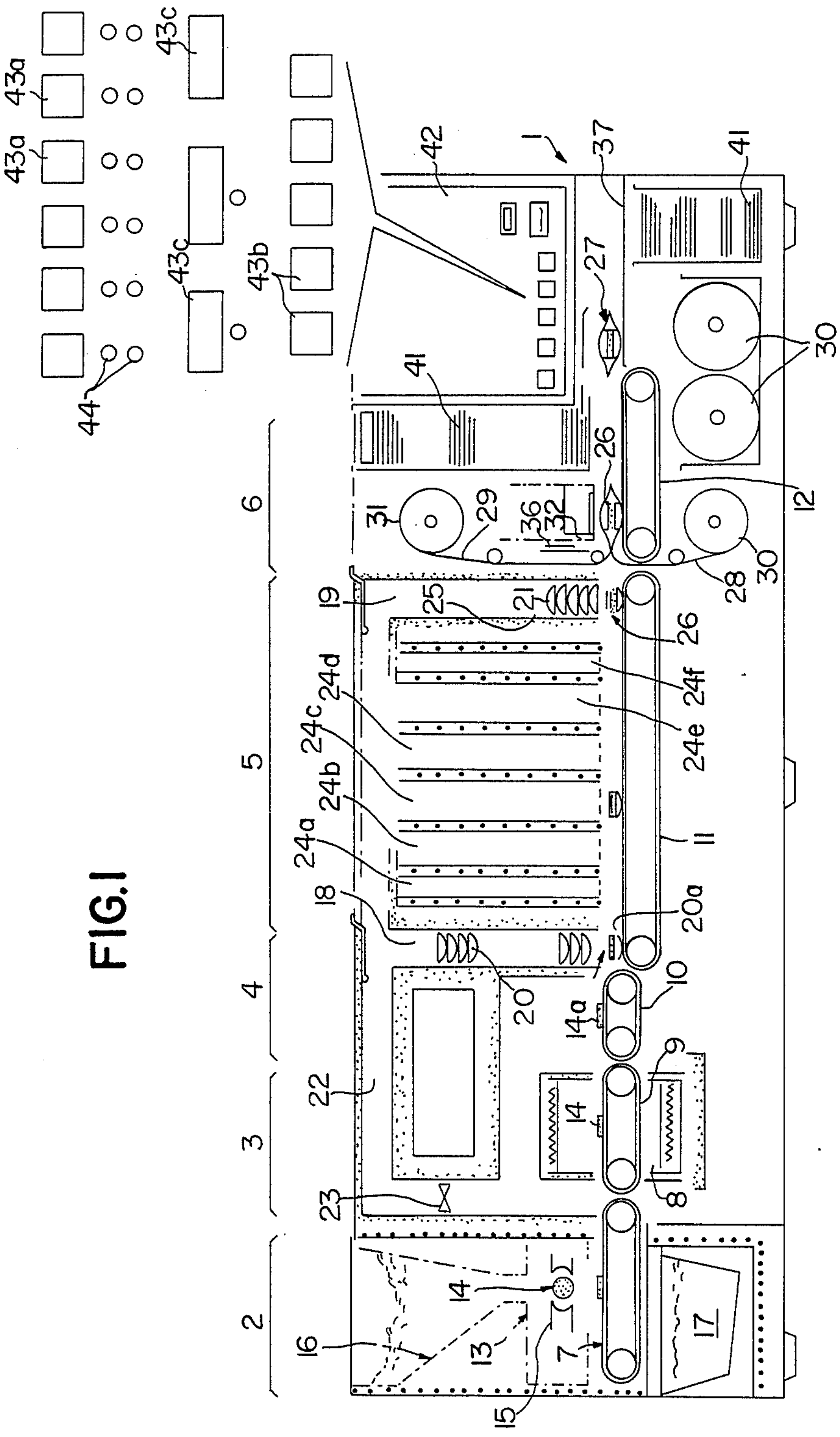
FIG. 1 is a schematic longitudinal sectional view of the complete vending machine in accordance with the invention.
Figure 2:
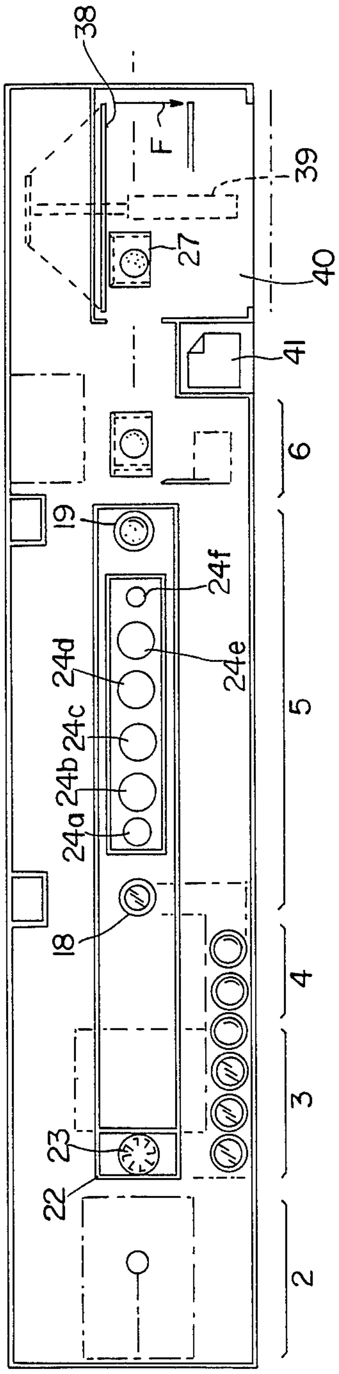
FIG. 2 is a schematic horizontal sectional view.

Starting from the end opposite to its delivery end 1, the vending machine shown in FIGS. 1 and 2 comprises the following work stations in succession:

- a feed station 2 for supplying reconstituted minced steak portions,
- a station 3 for cooking said steak portions,
- a station 4 for transferring these latter,
- a station 5 for placing said steak portions between two half-rolls of bread and for addition of ingredients,
- and finally a station 6 for forming each individual wrapper.

Over its entire length, said machine contains a conveyor subdivided into several sections, namely :

- a first section 7 for supplying the oven 8 which is placed opposite to the cooking station 3,
- a second section 9 which extends within the interior of said oven,
- a third section 10 for transferring steak portions as they pass out of said oven,
- a fourth section 11 opposite to the station 5 for positioning half-rolls and adding the desired ingredients,
- a fifth section 12 opposite to the station 6 for forming the wrapper.

In the example which is illustrated, the feed station 2 includes an apparatus for the reconstitution of minced steak portions, as designated by the general reference 13. This apparatus, which can be of the type described in French patent No. 2,589,686, is capable of reconstituting a minced steak portion 14 by means of a mincer and a slide 15 forming a mold, and is supplied from a hopper 16 containing pieces of meat. The entire assembly is placed within a refrigerated enclosure and provision can be made at the bottom of said enclosure for a bin 17 containing a reserve supply of pieces of meat. However, instead of being constituted by an apparatus 13 for reconstituting a steak portion, the feed station of the vending machine could just as readily consist of a reserve supply of deep-frozen minced steak portions already reconstituted and preserved at a negative temperature.

The arrangement of this feed station is such that each reconstituted steak portion thus obtained is transferred in a flat position on the first section 7 of the conveyor. This steak portion is thus transferred into the oven 8 which constitutes the cooking station. Said portion then passes onto the section 10 of the conveyor in order to be transferred into the station 5 for positioning half-rolls and additive ingredients.

Said station 5 has two end magazines 18 and 19 for storage of half-rolls. The first magazine 18 is employed for storing a first series of half-rolls 20 which are placed one above the other with their cutting planes directed upwards In regard to the second end-magazine 19, this latter serves to store a second series of half-rolls 21 which are placed one above the other in the opposite direction. These two magazines both constitute stations for delivering each of the half-rolls which form part of the two series. To this end, each magazine is constituted by a vertical chute which is capable of delivering one half-roll each time. Preferably, these half-rolls are stored in the hot state by heating the magazines 18 and 19. Heating can be carried out by connecting the magazines to one or a number of ducts 22 which are in turn connected to the cooking oven 8 and equipped with an air extractor 23. Thus the hot air collected in or around the oven 8 serves to heat the two magazines 18 and 19.

It is worthy of note that the conveyor 11 which is placed opposite to the station for delivery of half-rolls and additive ingredients is located at a lower level than the transfer conveyor 10 located upstream. This displacement of level is such that each reconstituted steak portion **14*a* transferred by the conveyor 10 is deposited by this latter on the cutting plane of a half-roll 20*a* of the first series, said half-roll having been placed beforehand on the upstream end of the conveyor 11 (as shown in FIG. 1**). This accordingly has the effect of automatically positioning each minced steak portion on a first half-roll which serves as a steak support.

Following the first magazine 18 for delivering half-rolls, the station 5 comprises a series of separate and distinct magazines **24*a*, 24*b*, . . . 24*f* which have the intended function of delivering additive ingredients. By way of example, these magazines 24*a* can thus be assigned to delivery of the following ingredients: spices, slice of cheese, lettuce, onions, tomato ketchup, mustard. All these magazines are grouped together within a compartment 25 which is heat-insulated with respect to the two magazines 18 and 19** and is cooled to a temperature of +6° to +8° C., for example.

The different delivery magazines **24*a*, . . . 24*f* can be constituted by vertical chutes, the bottom orifice of which is located opposite to the conveyor 11**. A retaining member or metering device is provided at the lower end in order to deliver each time a predetermined dose of the corresponding ingredient. In the case of mustard and pasty seasoning sauces, the metering device can be of the pressure type. In order to deliver doses of lettuce and onions, provision is made for volumetric metering devices. In the case of spices, a metering device of the dispersion type is adopted. Finally in the case of cheese, recourse is had to a device for cutting a slice from a block of cheese which is introduced into the corresponding magazine.

As has already been mentioned, the second magazine 19 for delivering each half-roll 21 of the second series is located at the downstream end of the station 5. This magazine is capable of delivering, on the initial hamburger element formed earlier, a second half-roll 21 which forms a covering element. This accordingly completes the preparation of a hamburger 26 which is then transferred on the conveyor 12 provided opposite to the station 6.

Wrapping of each hamburger 26 is achieved by forming a pouch 27 around this latter by means of two films 28 and 29 of food-quality heat-sealable paper. The first film 28 is unwound from a reel 30 placed in the bottom portion of the machine, this film being engaged in the gap which exists between the two conveyors 11 and 12 so that its free end is placed on the top face of said second conveyor in order to receive each completed hamburger 26 as it is delivered by the conveyor 11. In regard to the film 29, it is unwound from a reel 31 located at the upper end of the machine and its free end extends above each completed hamburger 26.

The heat-sealing station includes a moving electrode 32 which is capable of heat-sealing the two films 28 and 29 along two lines 33 and 34 located at right angles. The first sealing line 33 extends transversely behind the position of the hamburger **26*a* to be wrapped. The second sealing line 34 extends on only one of the longitudinal sides of the two films in order to leave the opposite longitudinal side open. The wrapper 27** thus formed assumes the shape of a bag or pouch which is open on one side.

Figure 4:
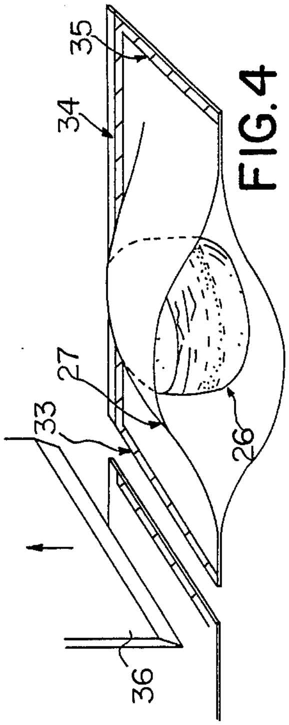
FIG. 4 is a view in perspective illustrating the completed wrapper and the hamburger placed within this latter.
Figure 3:
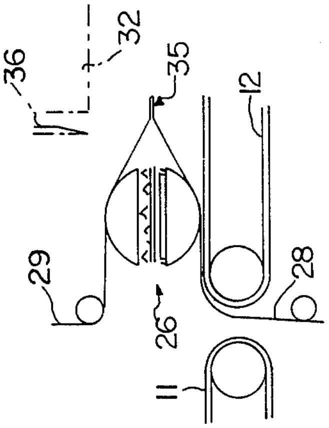
FIG. 3 is a schematic sectional view illustrating the mode of wrapping of a hamburger after preparation of this latter.

It should be noted that closing of this pouch along its transverse front edge 35 is ensured by the fact that the rear transverse seal 33 of the preceding wrapper had previously been formed at this point. In addition, the wrapping station considered is provided with a cutting blade 36 which is placed transversely and capable of cutting each transverse seal 33 into two parts so as to detach a completed wrapper 27 and to leave a transverse heat-sealing line 35 at the front end of the location of the following wrapper (as shown in FIG. 4).

The wrapper 27 which is thus formed and contains a hamburger 26 is transferred by the conveyor 12 onto a receiving platform 37. Above this platform is provided a push-bar 38 actuated by a jack 39 and capable of sliding said wrapper 27 in the transverse direction of the arrow F up to a delivery station 40 in which it can be taken by a consumer. Next to this station is advantageously provided a station 41 for dispensing paper napkins.

Fully automatic operation of all the moving elements and other mechanical devices of the vending machine considered is ensured by a programming system. This operation can be initiated by a consumer by means of a payment system (not shown). This can be a coin-operated slot machine or else a system for payment by magnetic card or the like, this system being installed opposite to a control panel 42 placed on the front face of the machine (as shown in FIG. 1).

However, said control panel is also provided with different control push-buttons **43*a*** of a programmer which is designed to enable the consumer himself (herself) to choose the ingredients to be added to the hamburger which he (she) has ordered.

This programmer is so designed that the consumer can add up to a maximum of five different ingredients chosen from the six ingredients provided. However, this programmer also makes it possible to double the dose of one of the ingredients chosen, in which case three other different ingredients may be added to this latter. After programming of the desired ingredients, the consumer must then proceed to validation of the order. Preferably, the vending machine is so designed that it is possible to order a number of hamburgers at a time, for example between one and five, subject to a corresponding payment. The desired quantity is controlled by actuating one of the push-buttons **43*b*. In addition, provision is made for validation and cancellation keys 43*c* as well as indicator lamps 44 associated with the push-buttons 43*a***.

The vending machine under consideration is intended to be put at the disposal of consumers, for example in stores or in public places for operation at all hours of the day and night. The machine can thus be placed in shopping centers, all public buildings, amusement parks, theaters and cinemas, exhibition areas, service stations. The machine may accordingly be installed inside or outside a building, on a public thoroughfare. These very numerous possibilities of installation and utilization without any need for personnel constitute an essential advantage of this machine since hamburgers can be ordered directly by the consumers themselves at any time and at any hour.

The vending machine in accordance with the invention is not limited to the delivery of hamburgers prepared beforehand and simply reheated at the moment of ordering by consumers. In fact, each hamburger produced on demand by this machine is made from the usual basic elements and the reconstituted steak itself is cooked in the usual manner just before consumption. In consequence, the present machine dispenses fresh hamburgers which are supplied hot and in their normal state with the same qualities of taste as hamburgers which are prepared by hand at the consumer's request.

Instead of reconstituted minced steak portions, the present machine is capable of delivering any other piece of cooked meat between two complementary half-rolls 20 and 21. Alternatives may include in particular pieces of chicken which have been cooked in the oven 8 in the same manner as described earlier in the case of reconstituted portions of minced steak.

In a simplified form of construction, the machine under consideration may not be equipped with the various magazines **24*a*, 24*b*, . . . 24*f* for distribution of additive ingredients and seasoning, the programmer associated with these magazines being also suppressed. In such a case, this machine comprises only the two magazines 18 and 19** for delivery of bread rolls. Between these latter, however, provision can be made for one or two magazines for the delivery of seasoning products which operate automatically each time without any possibility of modification by the consumer. Although less highly perfected than the machine described earlier, this form of construction has the advantage of being less costly.

Figure 5:
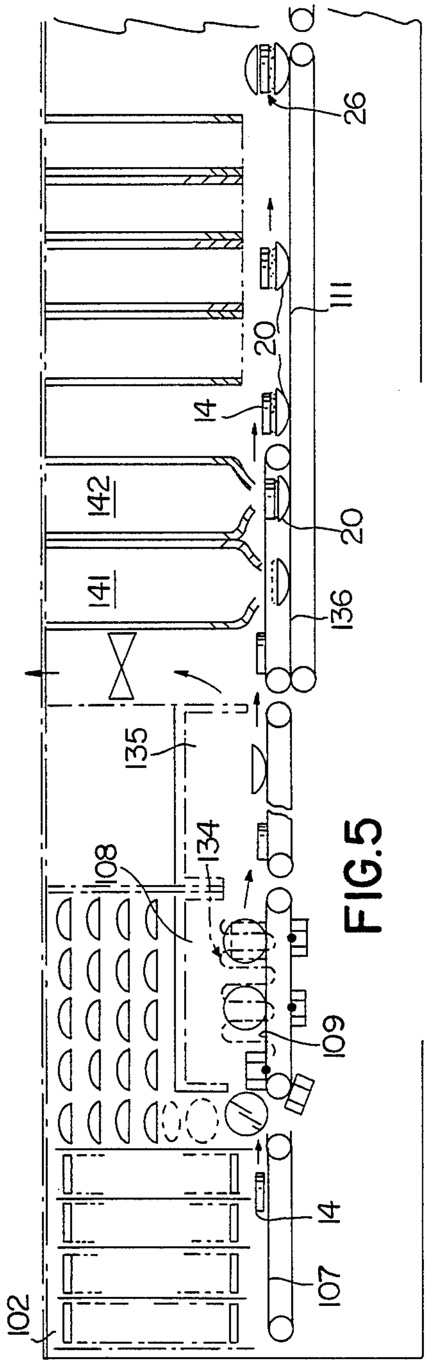
FIG. 5 is a partial view which is similar to FIG. 1 but which shows another form of construction of a vending machine in accordance with the invention.
Figure 6:
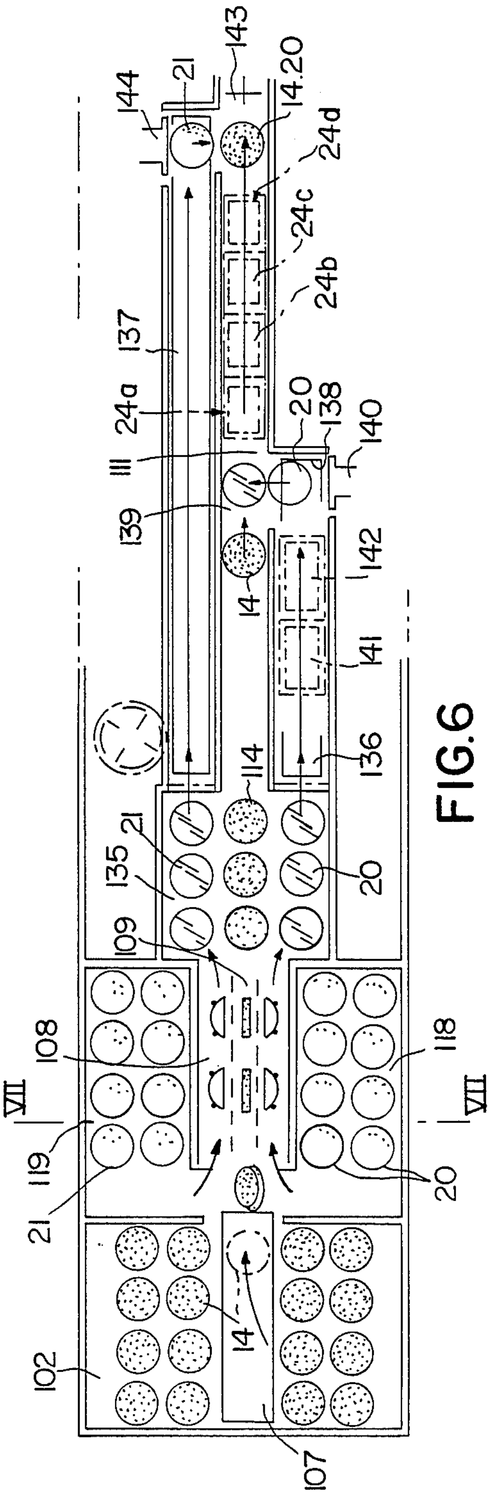
FIG. 6 is a schematic horizontal sectional view of the machine.

FIGS. 5 and 6 illustrate yet another embodiment of the machine in accordance with the invention. This embodiment differs from those of FIGS. 1 and 2 especially in the fact that the half-rolls are no longer stored in the hot state but are kept at ambient temperature in order to be toasted in the oven at the same time as cooking of the minced steak or other piece of meat provided.

The example described below relates to the case of minced steak portions. These portions are kept in a deep-frozen state after having been pre-braised. To this end, provision is made for a refrigerated enclosure 102 located upstream of the corresponding oven 108. The steak portions 14 are transferred to this oven by means of a conveyor 107. Two half-roll magazines 118 and 119 are located on each side of the oven 108. The first magazine is used for storing the first series of half-rolls 20 whilst the magazine 119 serves to store the half-rolls 21 of the second series.

Figure 7:
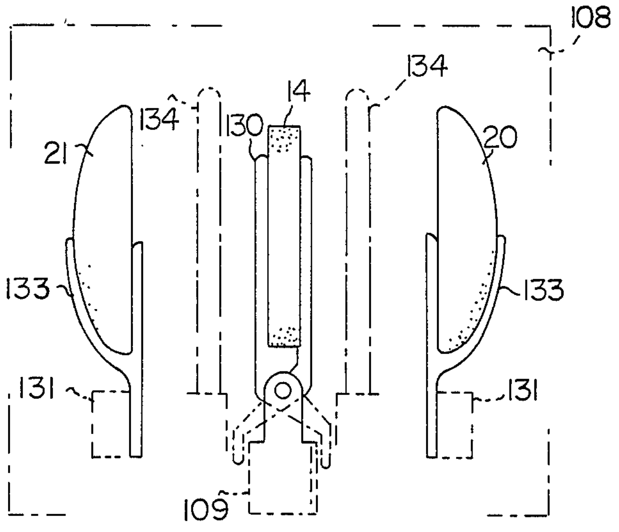
FIG. 7 is a schematic transverse sectional view of the cooking oven, this view being taken along line VII—VII of FIG. 6.
Figure 8:
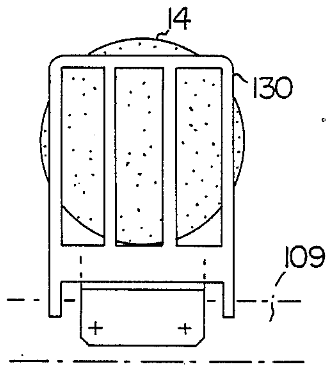
FIGS. 8 and 9 are detail views in elevation showing the tongs which equip two of the conveyors provided within the cooking oven.
Figure 9:
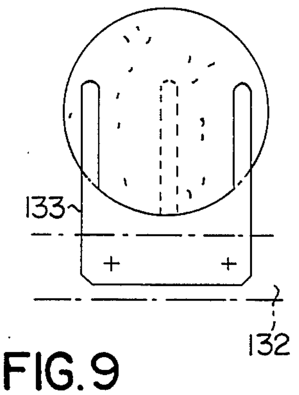
Figure 10:
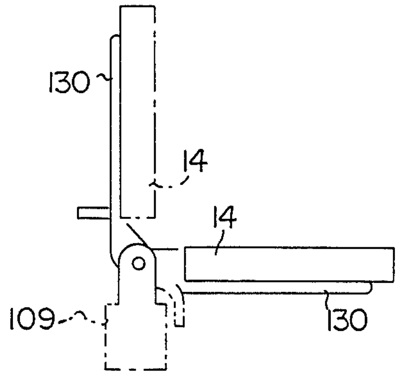
FIG. 10 is a schematic end view of the tong unit shown in FIG. 8.

The oven 108 contains three conveyors placed in parallel relation. A first conveyor 109 which is located at the center serves to transport steak portions to be cooked. This conveyor is provided with tongs 130 having an open structure and capable of maintaining a steak portion in the vertical position as it travels within the oven 108. One of the jaws of these tongs is articulated in order to grip and take a steak portion from the upstream conveyor 107 as well as to permit subsequent delivery of said portion on a downstream conveyor. Two other conveyors 131 and 132 are located on each side of said conveyor 109. These conveyors have tongs 133 which are capable of holding the half-rolls 20 and 21 of the two series in a vertical position as shown in FIG. 7, these half-rolls being supplied from the two storage magazines 118 and 119. The oven 108 is provided with electric resistors 134 which are placed on each side of the central conveyor 109. Said oven thus has the double function of cooking steak portions 14 and of light surface toasting of the half-rolls 20 and 21.

On the downstream side of the oven 108, provision is made for a storage oven 135 having the intended function of receiving both the steak portions 14 and the half-rolls 20 and 21 which are discharged from the cooking oven. Said storage oven is maintained at a temperature which can be of the order of 40 to 70° C. (65° C., for example), this oven being intended to constitute a virtual "buffer" zone.

On the downstream side of said storage oven, the cooked steak portions 14 are collected by a conveyor 109. In regard to the half-rolls 20 and 21 of the two series, they are collected respectively by two lateral conveyors 136 and 137 which extend in a direction parallel to the conveyor 109 on each side of this latter. However, the conveyor 136 is located at a lower level than the conveyor 109. The downstream end 138 of the conveyor 136 is contiguous to the upstream end 139 of the conveyor 111 located in the line of extension of the conveyor 109 but at the same level as the conveyor 136. A suitable transfer device such as a lateral pusher 140, for example, serves to transfer each half-roll 20 of the first series onto the upstream end 139 of the conveyor 111. When this transfer is completed, said half-roll receives a steak portion 14 supplied by the conveyor 109.

However, on the upstream side of said transfer station, provision is made for two magazines 141 and 142 which are placed above the conveyor 136. The first magazine is intended to deliver a lettuce leaf onto each half-roll 20. The function of the second magazine is to deliver a dose of sauce on top. These ingredients are therefore present on the top face of each half-roll 20 prior to positioning of a steak portion 14.

On the downstream side of the transfer station constituted by the end 139 of the conveyor 111, a number of magazines **24*a*, 24*b*, 24*c* and 24*d* are provided for the delivery of additive ingredients and are identical with the magazines provided in the vending machine shown in FIGS. 1 and 2**. It may in any case be noted that, in this respect, the present machine can be wholly identical with the machine described earlier.

The second lateral conveyor 137 already mentioned extends to the downstream end 143 of the central conveyor 111. However, said conveyor 137 is located at an upper level in order to be capable of transferring the half-rolls 21 of the second series to a point located above an initial hamburger element constituted by a first half-roll 20 which carries a steak portion 14 and the ingredients provided. The transfer of said second half-roll 21 is carried out by means of a suitable device such as a lateral pusher 144, for example. After this transfer, a complete hamburger 26 is therefore obtained as in the vending machine described earlier. Moreover, a wrapping station is located downstream of the machine described in the foregoing and is identical with that of the machine illustrated in FIGS. 1 and 2. It is for this reason that this station is not shown in FIGS. 5 and 6.

The programming system provided in the present machine is such that, as soon as an order has been given, a steak portion 14 passes out of the storage oven 135 whilst two complementary half-rolls 20 and 21 also pass out of said storage oven so as to be placed on each side of the steak portion as described earlier. An automatic control operation then initiates cooking of another steak portion in the cooking oven. This permits a considerable saving of time in all the operations performed.

Instead of providing a programming system which obliges the consumer to choose each ingredient, it is possible to provide a system which offers a choice between a number of different combinations of ingredients. Furthermore, the machine in accordance with the invention can be equipped with two separate meat storage containers in order to give consumers a choice between two different types of meat such as, for example, minced steak and pieces of chicken. However, it will remain apparent that many alternative embodiments and modifications may be contemplated.

What is claimed is:

1. A vending machine for preparing and delivering hamburgers, wherein automatic operation of said machine can be initiated by a consumer by means of a payment system and wherein said machine comprises in the direction of feed of one or a plurality of conveyors terminating at a station for the delivery of each hamburger:

a cooking oven through which the conveyor passes and which is capable of cooling each piece of meat supplied from a supply of pieces of meat, a first station for delivering a first series of half-rolls of bread on the conveyor in order that each half-roll may serve as an element for receiving a piece of meat supplied from the cooking oven, a second station for delivering a second series of half-rolls of bread in order that each half-roll may serve as a covering element on a piece of meat already carried by a first half-roll of the first series, a station for wrapping each hamburger thus formed, the function of this station being to wrap said hamburger between two films of wrapping material, within a pouch which is open on one side, the conveyor being divided into two successive sections upstream of the first station for delivering each half-roll of the first series, the upstream section of said conveyor being located at a higher level than the downstream section so as to deliver a piece of meat on the top face of a first half-roll which has already been placed on the downstream section of the conveyor.

2. A vending machine according to claim 1, wherein said machine is provided between the two stations for delivering half-rolls of bread with one or a number of successive magazines for delivering additive ingredients, each magazine aforesaid being capable of depositing a dose of the corresponding ingredient on a piece of meat carried by a half-roll.

3. A vending machine according to claim 2, wherein the delivery or metering devices of the different magazines for delivering ingredients are controlled in dependence on a programmer which can be operated by a consumer in order that the ingredient or ingredients to be added to the piece of meat of the hamburger ordered by the consumer may be chosen by the consumer.

4. A vending machine according to claim 2, wherein the different magazines for delivering additive ingredients are grouped together within a refrigerated compartment whilst the two stations for delivering the two series of half-rolls consist of two heated storage magazines.

5. A vending machine according to claim 4, wherein heating of the magazines for delivering half-rolls is carried out by a hot air extractor connected to the outlet of the cooking oven and by means of ducts connected to said two delivery magazines.

6. A vending machine for preparing and delivering hamburgers, wherein automatic operation of said machine can be initiated by a consumer by means of a payment system and wherein said machine comprises in the direction of feed of one or a plurality of conveyors terminating at a station for the delivery of each hamburger:

a cooking oven through which the conveyor passes and which is capable of cooking each piece of meat supplied from a supply of pieces of meat, a first station for delivering a first series of half-rolls of bread on the conveyor in order that each half-roll may serve as an element for receiving a piece of meat supplied from the cooking oven, a second station for delivering a second series of half-rolls of bread in order that each half-roll may serve as a covering element on a piece of meat already carried by a first half-roll of the first series, a station for wrapping each hamburger thus formed, the function of this station being to wrap said hamburger between two films of wrapping material, within a pouch which is open on one side, the conveyor being divided into two sections upstream of the wrapping station and a lower film of wrapping material being introduced in a gap thus formed in such a manner as to ensure that a free end of said lower film is placed on the downstream section of the conveyor in order to receive the hamburgers which come from the upstream section whilst an upper film of wrapping material is spread over each hamburger, said wrapping station being capable of heat-sealing these two films along a rear transverse line and along only one of the two longitudinal sides in order that the wrapper thus formed should remain open on the other side.

7. A vending machine according to claim 6, wherein the conveyor is divided into two successive sections upstream of the first section for delivering each half-roll of the first series, the upstream section of said conveyor being located at a higher level than the downstream section, and wherein the conveyor for transporting half-rolls of the first series terminates at the upstream end of the downstream section of the conveyor for transporting pieces of meat.

8. A vending machine according to claim 7, wherein the conveyor for transporting the half-rolls of the second series is located at a higher level than the downstream section of the conveyor for transporting the pieces of meat and said conveyor terminates at the downstream end of said downstream section in order to direct a second half-roll on top of a piece of meat which has been placed on a first half-roll and has received the desired ingredients.

9. A vending machine according to claim 7 wherein a station for delivery of a lettuce leaf or the like and possibly also a station for delivery of a sauce are provided above the conveyor for transporting the half-rolls of the first series, in order to effect said delivery before placing a piece of meat in position.

10. A vending machine according to claim 6, wherein a storage oven is placed between the cooking oven and the subsequent conveyors in order to store at a predetermined temperature between 40° and 70° C., for example, a predetermined quantity of pieces of meat as they pass out of the cooking oven and of half-rolls of both series as they also pass out of said cooking oven.

11. A vending machine for preparing and delivering hamburgers, wherein automatic operation of said machine can be initiated by a consumer by means of a payment system and wherein said machine comprises in the direction of feed of one or a plurality of conveyors terminating at a station for the delivery of each hamburger:

a cooking oven through which the conveyor passes and which is capable of cooking each piece of meat supplied from a supply of pieces of meat, a first station for delivering a first series of half-rolls of bread on the conveyor in order that each half-roll may serve as an element for receiving a piece of meat supplied from the cooking oven, a second station for delivering a second series of half-rolls of bread in order that each half-roll may serve as a covering element on a piece of meat already carried by a firs half-roll of the first series, a station for wrapping each hamburger thus formed, the function of this station being to wrap said hamburger between two films of wrapping material, within a pouch which is open on one side, there being two separate and distinct magazines upstream of the cooking oven for storing the two series of half-rolls of bread and said two magazines feeding two conveyors which pass through the cooking oven in parallel relation to the conveyor which carries the pieces of meat to be cooked, said two conveyors being followed by conveyors which terminate at the two separate stations for delivering half-rolls belonging to both series of half-rolls.

* * * * *